US012591263B2

(12) United States Patent
Coban

(10) Patent No.: US 12,591,263 B2
(45) Date of Patent: Mar. 31, 2026

(54) VOLTAGE AND CURRENT REFERENCE CIRCUITS PROVIDING VOLTAGE AND CURRENTS WITH NEAR ZERO TEMPERATURE COEFFICIENTS

(71) Applicant: Silicon Laboratories Inc., Austin, TX (US)

(72) Inventor: Abdulkerim Coban, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 256 days.

(21) Appl. No.: 18/202,093

(22) Filed: May 25, 2023

(65) Prior Publication Data

US 2024/0393819 A1 Nov. 28, 2024

(51) Int. Cl.
*G05F 1/567* (2006.01)
*G05F 3/24* (2006.01)
*G05F 3/26* (2006.01)

(52) U.S. Cl.
CPC .............. *G05F 3/245* (2013.01); *G05F 1/567* (2013.01); *G05F 3/262* (2013.01)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/462; G05F 1/56; G05F 1/562; G05F 1/565; G05F 1/567; G05F 1/569; G05F 1/571; G05F 1/573; G05F 1/5735

See application file for complete search history.

(56) References Cited

U.S. PATENT DOCUMENTS 5,666,046 A * 9/1997 Mietus .................... G05F 3/267 323/907
6,528,979 B2 3/2003 Kimura
7,148,672 B1 * 12/2006 Holmes ..................... G05F 3/30 327/539
7,321,225 B2 1/2008 Garlapati et al.
7,420,359 B1 * 9/2008 Anderson ................. G05F 3/30 327/535
8,791,683 B1 * 7/2014 Porter ....................... G05F 3/30 323/907
10,001,793 B2 * 6/2018 Chu .......................... G05F 3/30
(Continued)

*Primary Examiner* — Monica Lewis
*Assistant Examiner* — Nusrat Quddus
(74) *Attorney, Agent, or Firm* — Zagorin Cave LLP

(57) ABSTRACT

A voltage reference circuit can operate in a large supply voltage range, including a low supply voltage, and can operate with high PSRR. The voltage reference circuit supplies a voltage reference with a near zero temperature coefficient (TC) across a wide-temperature range. The voltage reference circuit develops a first current with a positive temperature coefficient from a first transistor and a second current with a negative temperature coefficient from a second transistor. The control terminals of the two transistors are supplied by respective outputs of two error amplifiers. The two currents are combined to develop a voltage reference across a resistor. The voltage reference has a near zero temperature coefficient.

20 Claims, 10 Drawing Sheets

(56) References Cited

U.S. PATENT DOCUMENTS

| | | | | |
|---|---|---|---|---|
| 10,061,340 | B1 * | 8/2018 | Rao | G05F 3/267 |
| 10,290,330 | B1 * | 5/2019 | Kamath | G01K 7/015 |
| 11,099,594 | B1 * | 8/2021 | Kanoun | G05F 3/267 |
| 11,353,903 | B1 | 6/2022 | Coban | |
| 11,392,156 | B2 * | 7/2022 | Elwan | G05F 1/463 |
| 2003/0038672 | A1 * | 2/2003 | Buckley, III | G05F 3/30 327/539 |
| 2004/0155700 | A1 * | 8/2004 | Gower | G05F 3/30 327/543 |
| 2008/0116965 | A1 * | 5/2008 | Ogiwara | G05F 3/30 327/543 |
| 2010/0171547 | A1 * | 7/2010 | Fang | G05F 3/30 327/538 |
| 2017/0168518 | A1 * | 6/2017 | Rasmus | G05F 3/24 |
| 2023/0118374 | A1 * | 4/2023 | Veldhoven | H03F 3/45197 330/291 |

* cited by examiner

VOLTAGE AND CURRENT REFERENCE CIRCUITS PROVIDING VOLTAGE AND CURRENTS WITH NEAR ZERO TEMPERATURE COEFFICIENTS

BACKGROUND

Field of the Invention

This disclosure relates to voltage and current reference circuits.

Description of the Related Art

Internet of Things (IoT) devices often operate from batteries and therefore power consumption in IoT devices is an important concern. Typically, the core device voltage needs to be low to save power. Low-power/low-voltage temperature independent voltage reference circuits having low output noise would provide versatile building blocks in many analog and RF circuits. Having low sensitivity to supply variations and to supply noise is also desirable as it relaxes supply filtering requirements, which saves die area and additional power dissipation. Improvements in supplying voltage and current references to support operation of low voltage devices would be desirable.

SUMMARY OF EMBODIMENTS

Accordingly, in an embodiment a voltage reference circuit includes a first amplifier and a second amplifier. A first transistor of a first conductivity type has first and second current terminals coupled between a first supply voltage node and an output node, and has a control terminal coupled to an output of the first amplifier. A second transistor (M6) of the first conductivity type has first and second current terminals coupled between the first supply voltage node and the output node, and has a gate terminal coupled to an output of the second amplifier. A first resistor is coupled between the output node and a second supply voltage node. The first transistor supplies a first current with a positive temperature coefficient to the first resistor and the second transistor supplies a second current a negative temperature coefficient to the first resistor. The first and second currents combine to generate an output voltage across the first resistor.

In another embodiment a method for providing a voltage reference from a voltage reference circuit includes supplying respective control terminals of a first transistor and a second transistor with a first voltage present on an output of a first amplifier. The first transistor supplies a first current to a first resistor. The second transistor supplies a second current that is proportional to a first voltage on a first input terminal of the first amplifier divided by a resistance value of the first resistor, the second current having a negative temperature coefficient. A control terminal of a third transistor is supplied with a second voltage present on an output of a second amplifier and the third transistor supplies a third current having a positive temperature coefficient. The second current and the third current are supplied to a second resistor to generate the voltage reference with a near zero temperature coefficient.

In another embodiment a reference circuit includes a first transistor having first and second current terminals coupled between a first supply voltage node and an output node supplying a voltage reference. The first transistor has a control terminal coupled to an output of a first amplifier. A second transistor has first and second current terminals coupled between the first supply voltage node and the output node, and has a control terminal coupled to an output of a second amplifier. A first resistor is coupled between the output node and a second supply voltage node. The first transistor supplies a first current with a positive temperature coefficient to the first resistor and the second transistor supplies a second current with a negative temperature coefficient to the first resistor. The first current and the second current combine to generate a voltage reference with a near zero temperature coefficient across the first resistor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
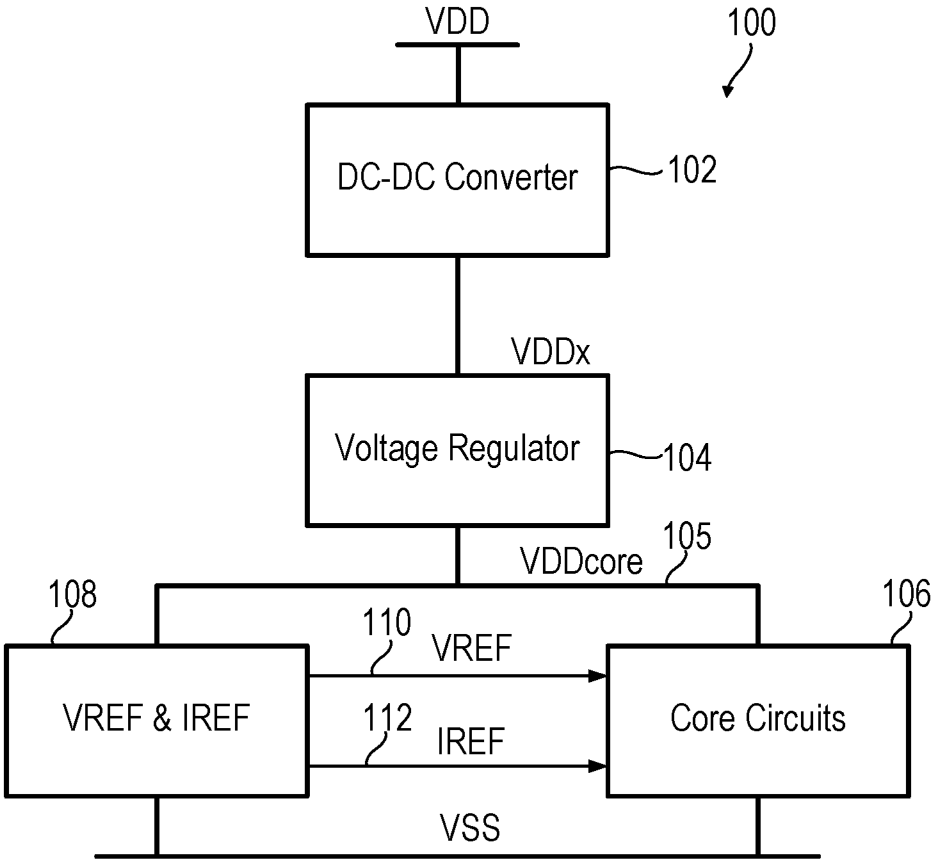
FIG. 1 illustrates a system that includes a voltage and current reference circuit that supplies a voltage reference and current references to core circuits.

Referring to FIG. 1, an exemplary system 100 converts a battery voltage (VDD) down to a lower voltage using a DC-DC converter 102. A regulator 104 can be utilized at the output of the DC-DC converter to supply a regulated core voltage 105 for use by core circuits 106. In addition, a voltage and current reference circuit 108 receives the VDD core voltage 105 and supplies a voltage reference (VREF) 110 and current reference (IREF) 112 for use by the core circuits. In an embodiment, the DC-DC converter 102 steps down, for example, a 3.3V battery supply voltage to an intermediate supply voltage of 1.2V (VDDx) and a voltage regulator (104) regulates VDDx voltage to a 0.9V core supply VDDcore. The reference circuit 108 needs to operate from a low supply voltage (VDDcore) without sacrificing performance.

Figure 2:
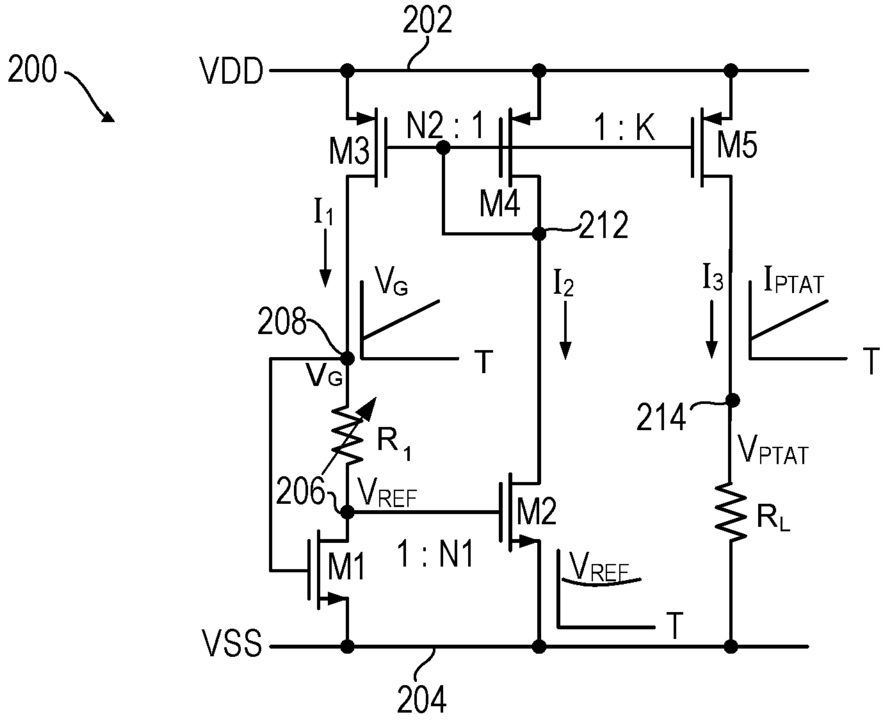
FIG. 2 illustrates an embodiment of a voltage reference circuit.

Referring to FIG. 2, a voltage reference circuit 200 is illustrated that supplies a temperature stable voltage reference but is limited in its ability to operate with a low supply voltage. The voltage reference circuit 200 is coupled between an upper supply voltage node 202 and a lower supply voltage node 204. The supply voltage node 202 receives a supply voltage VDD and the supply voltage node 204 receives a lower supply voltage VSS. In the voltage reference circuit 200, the output node 206 has a voltage reference $V_{REF}$ that remains substantially unaffected by variations of the supply voltage VDD. As further described herein, parameters of the voltage reference circuit 200 are selected to also ensure that $V_{REF}$ at node 206 is stable across an operating temperature (T) range as indicated by the $V_{REF}$ vs. T graph shown in FIG. 2. N1×N2 is chosen to be equal to 4 to improve power supply rejection ratio as explained further herein.

The voltage reference circuit 200 includes transistors coupled in a current mirror configuration. Each transistor has a pair of current terminals (source and drain terminals) and a control terminal (a gate terminal). In the illustrated embodiment, transistors M1 and M2 are NMOS transistors and transistors M3 and M4 are PMOS transistors. Transistor M1 has a source terminal coupled to the VSS node 204, a drain terminal coupled to the $V_{REF}$ node 206, and a gate terminal coupled to the intermediate node 208, which has a voltage $V_G$. As shown in the graph of $V_G$ vs. T in FIG. 2, $V_G$ has a positive temperature coefficient. That is, as temperature rises, the voltage $V_G$ also rises. A resistor $R_1$ is coupled between nodes 206 and 208. Transistor M2 has a source terminal coupled to the VSS node 204, a gate terminal coupled to the $V_{REF}$ node 206, and a drain terminal coupled to the intermediate node 212. Transistor M3 has a source terminal coupled to the VDD node 202, a gate terminal coupled to node 212, and a drain terminal coupled to the node 208. Transistor M4 has a source terminal coupled to VDD node 202 and gate and drain terminals coupled to node 212. Transistor M5 has a source terminal coupled to the VDD node 202, a drain terminal coupled to node 214 and a gate terminal coupled to node 212.

The currents $I_1$, $I_2$, and $I_3$ are related to each other with the currents $I_2$ and $I_3$ dependent on the size ratios of the transistors. In the embodiment shown in FIG. 2, the ratio of the relative size of M1 to the size of M2 is 1:N1, and the ratio of the relative size of M3 to the size of M4 is N2:1. The ratio of the relative size of M4 to the size of M5 is 1:K. The size of a MOS transistor is determined by its width to length ratio, or W/L. Transistor size translates to relative drain current capacity. Thus, a transistor that is twice the size of another transistor means it has twice the drain current capacity assuming other circuit factors are equivalent. Transistors may be coupled in parallel to change the size of a transistor. For example, coupling two "unit" transistors in parallel can be used to double the size of the transistor. A desired relative size can be accomplished by adjusting W/L of one transistor relative to another transistor. The threshold voltage of two transistors targeted for a particular size ratio (e.g., N2:1, 1:N1, 1:K) are typically the same or substantially equal.

The current $I_1$ flows from the drain terminal of M3, and a corresponding current $I_2$ having a value of $I_1$/N2 flows from the drain terminal of M4 into the drain terminal of M2. The current $I_3$ having a value of $KI_2$ flows from the drain terminal of M5. Assume that M1 and M2 are operating in saturation (or strong-inversion) region and that drain current ID versus gate to source voltage ($V_{GS}$) characteristics are governed by a "square-law" relationship having a power factor of 2.

Assuming the MOS devices shown in FIG. 2 have "square law" characteristics, $$g_{m1}R_1 = 2\left(1 - \frac{1}{\sqrt{N_1N_2}}\right) \tag{1}$$

where $g_{m1}$ is the transconductance of M1 and $R_1$ is the resistance between nodes 208 and 206.

$$I_1 = \frac{g_{m1}^2}{2\beta_1} = \frac{2}{\beta_1R_1^2}\left(1 - \frac{1}{\sqrt{N_1N_2}}\right)^2 \tag{2}$$

where $\beta_1$ is the gain factor of the MOS transistor M1 and N1 and N2 are the size ratios shown in FIG. 2. For $\sqrt{N_1N_2}=2$, equations 1 and 2 become $$g_{m1}R_1 = 1 \text{ and } I_1 = \frac{1}{2\beta_1R_1^2}. \tag{3}$$

N1 and N2 can both be 2 or N1=4 and N2=1, or another combination, to achieve the appropriate values for $N_1$ and $N_2$.

As mentioned above, the ability to properly handle variations in the power supply (VDDcore in FIG. 1) by maintaining a stable output in spite of variations in the power supply is an important factor in the operation of a suitable voltage reference circuit. The power supply rejection ratio (PSRR) at various locations in the circuit reflect that capability. The transfer function from positive supply (VDD) or equivalently the inverse of PSRR ($PSRR^{-1}$) for the voltage $V_G$ at node 208 can be expressed as:

$$PSRR_{VG}^{-1} = \frac{1}{1 + g_{m1}r_{o3}},$$

where $r_{o3}$ is the output impedance of M3.

The $PSRR^{-1}$ for the voltage reference $V_{REF}$ at node 206 can be expressed as:

$$PSRR_{VREF}^{-1} = \frac{1 - g_{m1}R_1}{1 + g_{m1}r_{o3}}.$$

Since $$g_{m1}R_1 = 1 \text{ for } N1 \times N2 = 4,\ PSRR_{VR}^{-1} = 0.$$

Of course non-idealities will typically make the $$PSRR_{VR}^{-1}$$

close to 0 rather than 0 but those non-idealities still result in a high PSRR.

Finally, the PSRR for the voltage reference $V_{PTAT}$ at node at node 214 can be expressed as:

$$PSRR_{VPTAT}^{-1} = \frac{R_L}{R_L + r_{o5}},$$

where $r_{o5}$ is the output impedance of M5 and $R_L$ is the resistance $R_L$ between node 214 in FIG. 2 and VSS.

As can be seen, the PSRR at node 214 is not affected by the value of $g_{m1}R_1$.

It is desirable that the voltage reference $V_{REF}$ at node 206 has a zero temperature coefficient. Accordingly, the device size (W/L) of M1 is chosen to achieve that end. The circuit shown in FIG. 2 and variations thereof are discussed in U.S. Pat. No. 11,353,903, filed Mar. 31, 2022, naming Abdulkerim L. Coban as inventor, and entitled "Voltage Reference Circuit", which is incorporated by reference in its entirety. As shown in the graph of $V_{REF}$ vs. T in FIG. 2, the temperature coefficient of $V_{REF}$ is low, substantially zero, while the temperature coefficient of $V_G$ at node 208 is positive (upward sloping voltage) leading to the current $I_3$ being a proportional to absolute temperature (PTAT) current.

Figure 3:
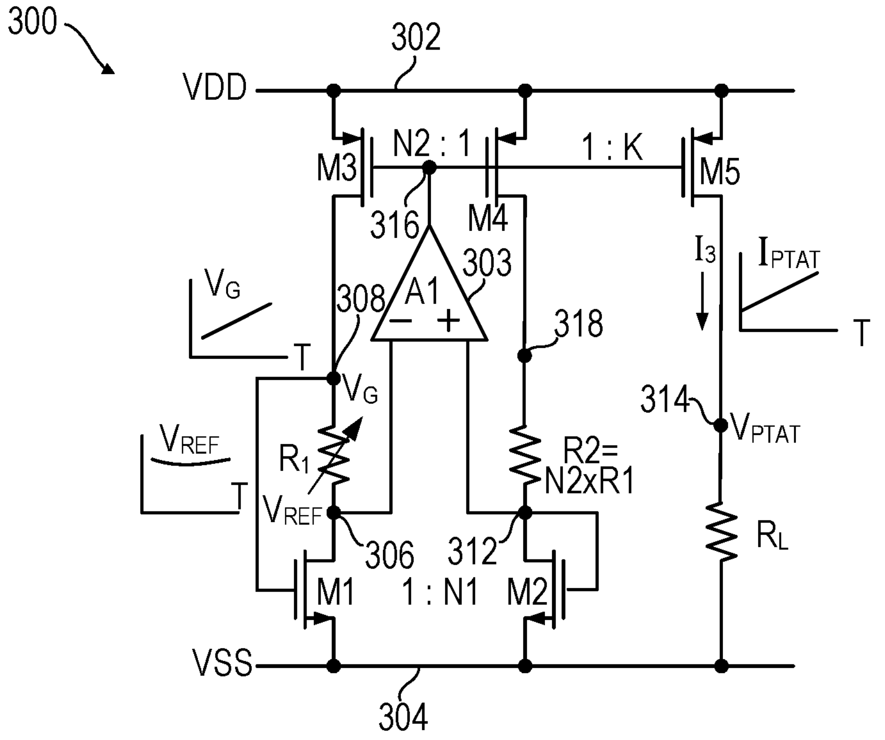
FIG. 3 illustrates another embodiment of a voltage reference circuit that includes an amplifier and provides a higher power supply rejection ratio (PSRR).

FIG. 3 shows another embodiment of a voltage reference circuit 300. The embodiment of FIG. 3 includes the error amplifier 303 with a gain of A1. Transistor M1 has a source terminal coupled to the VSS node 304, a drain terminal coupled to the $V_{REF}$ node 306, and a gate terminal coupled to the intermediate node 308, which has a voltage $V_G$. As shown in FIG. 3, $V_G$ has a positive temperature coefficient. That is, as temperature rises, the voltage $V_G$ also rises. A resistor R1 is coupled between nodes 306 and 308. Transistor M2 has a source terminal coupled to the VSS node 304 and a gate and drain terminal coupled to the intermediate node 312. Transistor M3 has a source terminal coupled to the VDD node 302, a drain terminal coupled to the node 308, and a gate terminal coupled to node 316, which is the output of amplifier 303. Transistor M4 has a source terminal coupled to VDD node 302, a drain terminal coupled to node 318 and a gate terminal coupled to node 316, which is the output of the error amplifier 303. Transistor M5 has a source terminal coupled to the VDD node 302, a drain terminal coupled to node 314 and a gate terminal coupled to node 316. The resistor R2 between nodes 318 and 312 is sized to be N2×R1 to reflect the difference in currents from the drains of M3 and M4. The use of the error amplifier 303 helps improve the PSRR of the voltage reference circuit 300 as compared to the voltage reference circuit 200.

For the voltage reference circuit 300, selecting $\sqrt{N_1N_2}=2$, results in $g_{m1}R_1=1$ and $$I_1 = \frac{1}{2\beta_1 R_1^2},$$

which is the same as the voltage reference circuit 200. But the PSRR calculations are improved by the amplifier gain. For the PSRR of $V_G$ at node 308, $$PSRR_{VG}^{-1} = \frac{1}{A_1(f)}\frac{1}{1 + g_{m1}r_{o3}}.$$

That can be seen to be an improvement by the amplifier gain ($A_1$(f)). The gain is frequency dependent and the PSRR at higher frequencies is less than at lower frequencies.

For the PSRR of the voltage reference $V_{REF}$ at node 306, $$PSRR_{VREF}^{-1} = \frac{1}{A_1(f)}\frac{1 - g_{m1}R_1}{1 + g_{m1}r_{o4}}.$$

That can be seen to be an improvement in the PSRR by the amplifier gain ($A_1$(f)).

Finally, for the PSRR of VPTAT at node 314

$$PSRR_{VPTAT}^{-1} = \frac{1}{A_1(f)}\frac{R_L}{R_L + r_{o5}}.$$

That can be seen to be an improvement in the PSRR by the amplifier gain ($A_1$(f)).

While both voltage reference circuits 200 and 300 develop a voltage reference $V_{REF}$ with a low (near zero) temperature coefficient, i.e., the voltage is relatively flat over temperature as shown in FIGS. 2 and 3, and both voltage reference circuits have a high PSRR (higher PSRR in voltage reference circuit 300), both embodiments have trouble supporting low voltage operations. Referring back to FIG. 2, the voltage $V_G$ at node 208 rises with temperature. For example, the voltage may rise from 0.7V to 0.9V with temperature. However, that rise in temperature makes both the voltage reference circuit 200 and the voltage reference circuit 300 non operational at higher temperatures as there is insufficient headroom for the transistor M3 to operate properly in either embodiment. Accordingly, another approach is needed to provide a voltage reference with a substantially flat temperature response, a high PSRR, and the ability to operate in low voltage environments.

Figure 4:
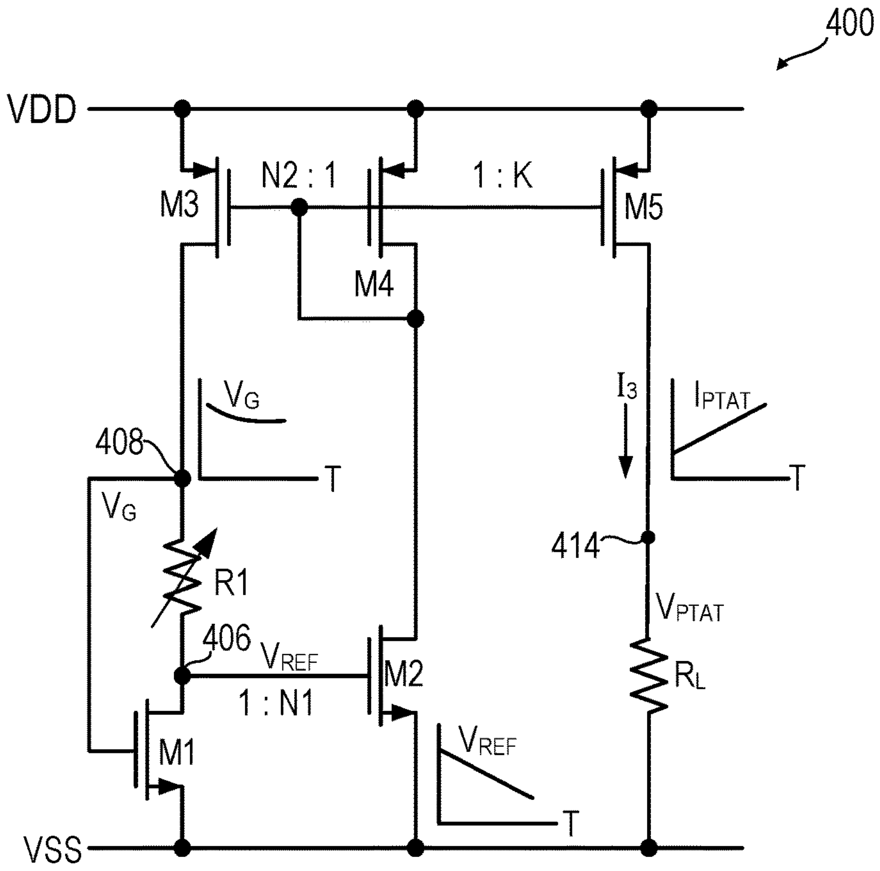
FIG. 4 illustrates an embodiment of a voltage reference circuit that allows a lower supply voltage but does not provide a stable voltage reference across temperature.

FIG. 4 illustrates an embodiment of a voltage reference circuit 400 in which the circuit is configured through selection of transistor size and resistance values to cause $V_G$ at node 408 to have a near zero or negative temperature coefficient resulting in a substantially flat or slightly downward sloping temperature characteristic as shown in FIG. 4. While that allows lower VDD operations, it also results in $V_{REF}$ at node 406 having a negative temperature coefficient. Many applications require a voltage reference that is stable over temperature. Note that $I_3$ and $V_{PTAT}$ at node 414 still have a positive temperature coefficient.

Figure 5:
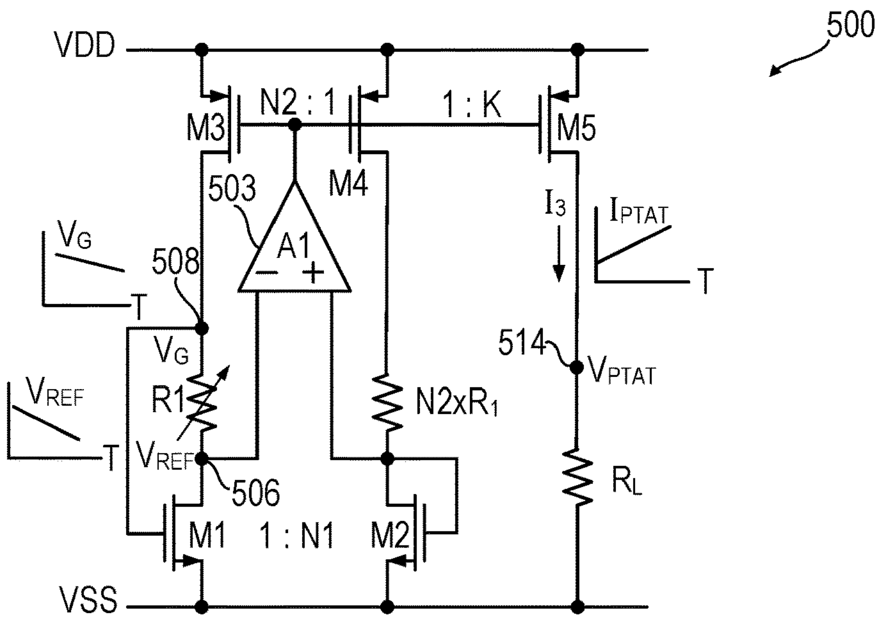
FIG. 5 illustrates another embodiment of a voltage reference circuit that allows a lower supply voltage but does not provide a stable voltage reference across temperature.

FIG. 5 illustrates an embodiment of a voltage reference circuit 500 with amplifier 503 in which the circuit is configured through selection of transistor size and resistance values to cause $V_G$ at node 508 to have a near zero or negative temperature coefficient resulting in a substantially flat or slightly downward sloping temperature characteristic as shown in FIG. 5. While that allows lower VDD operations, it also results in $V_{REF}$ at node 506 having a negative temperature coefficient. Many applications require a voltage reference that is stable over temperature. Note that $I_3$ and $V_{PTAT}$ at node 514 still have a positive temperature coefficient.

Figure 6:
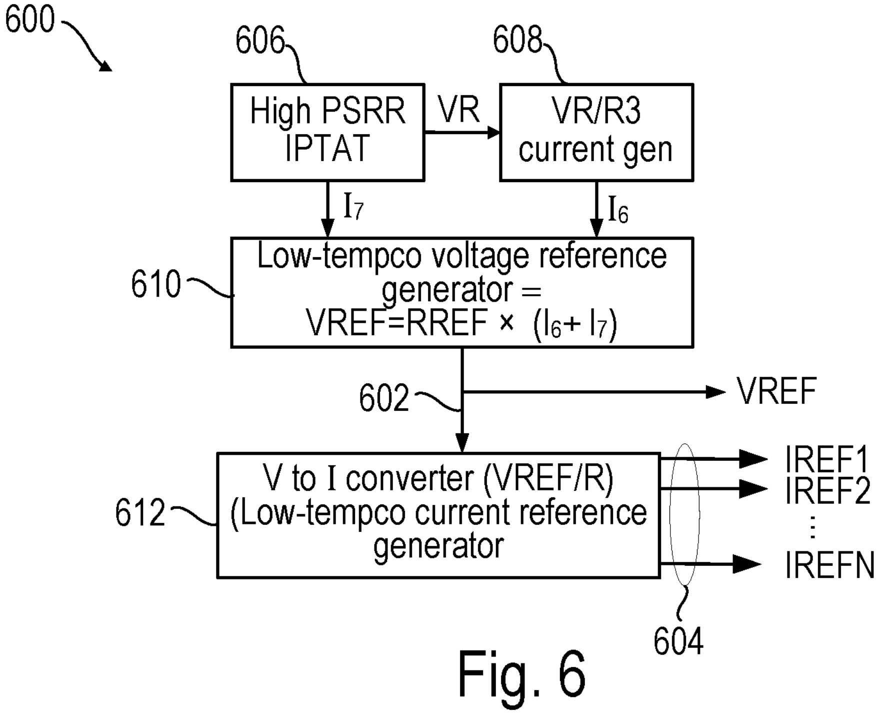
FIG. 6 illustrates a high-level block diagram of an embodiment of a voltage reference circuit that allows operation with a low supply voltage and provides a temperature stable voltage reference and currents reference.

FIG. 6 illustrates a high level block diagram of an embodiment of voltage and current reference circuit 600 that allows low voltage operation and provides a temperature stable voltage reference 602 and reference currents 604. The reference circuit 600 includes a block 606 that is responsible for generating an IPTAT (current proportional to absolute temperature) current $I_7$. The block 608 generates a current $I_6$ with a negative temperature coefficient discussed further below. The currents $I_6$ and $I_7$ are described in more detail below. Those two currents are combined in block 610 to generate a voltage reference across a resistor RREF (value equal to R4 in FIG. 7) with a temperature coefficient that is near zero resulting in a substantially flat temperature characteristic. A voltage to current converter 612 supplies reference currents.

Figure 7:
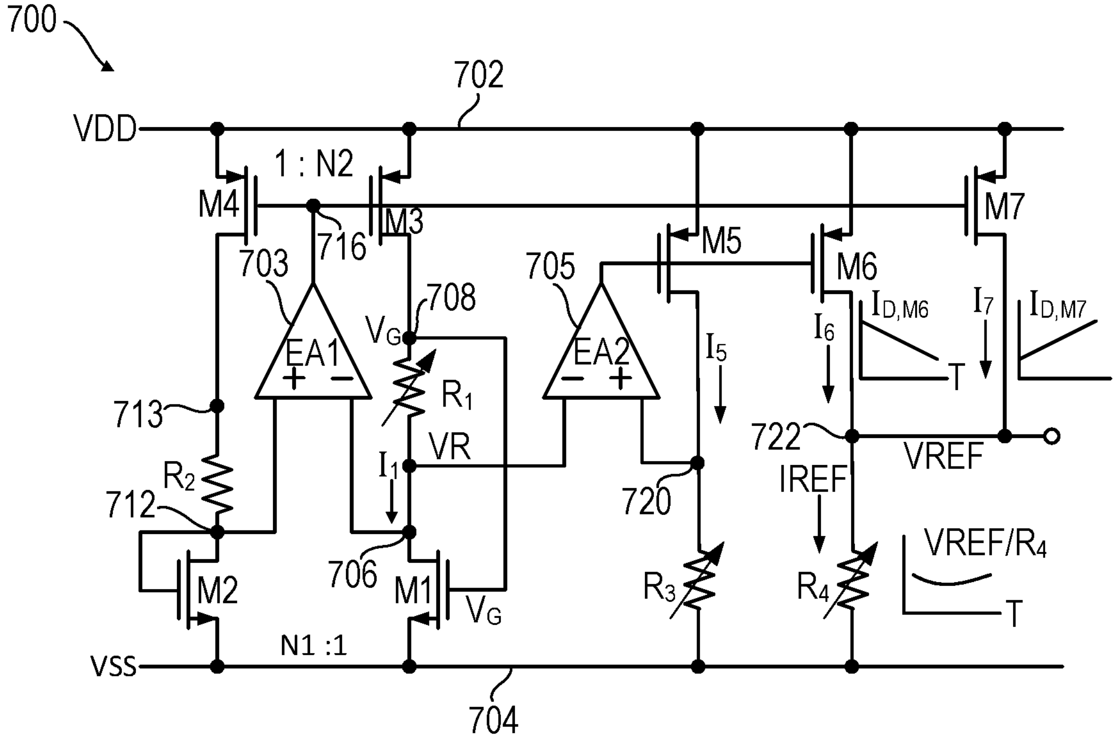
FIG. 7 illustrates an embodiment of a voltage reference circuit that is capable of operating with a low supply voltage and also supplies a voltage reference that is stable over temperature.

FIG. 7 illustrates an embodiment of a voltage reference circuit 700 that develops a voltage $V_G$ at node 708 with a near zero or negative temperature coefficient resulting in low supply voltage capability. While $V_G$ can have a flat temperature characteristic, a negative slope characteristic results can be advantageous in that voltages across temperature are lower compared to the case of $V_G$ having a flat temperature characteristic. The voltage reference circuit 700 generates a voltage reference $V_{REF}$ that is stable over temperature. The near zero or negative temperature coefficient allows the circuit to operate with a low supply voltages, e.g., a VDD of 0.7V, without running into the headroom problems described for the voltage reference circuits 200 and 300 shown respectively, in FIGS. 2 and 3. NMOS transistor M1 has a source terminal coupled to the VSS node 704, a drain terminal coupled to the VR node 706, and a gate terminal coupled to the intermediate node 708, which has a voltage $V_G$. The resistor $R_1$ is coupled between nodes 706 and 708. NMOS transistor M2 has a source terminal coupled to the VSS node 704, a gate and drain terminal coupled to the node 712. PMOS transistor M3 has a source terminal coupled to the VDD node 702, a drain terminal coupled to the node 708, and a gate terminal coupled to node 716, which is the output of amplifier 703. PMOS transistor M4 has a source terminal coupled to VDD node 702, a drain terminal coupled to node 713 and a gate terminal coupled to node 716, which is the output of the error amplifier 703. Resistor R2 is coupled between the drain terminal of transistor M4 (node 713) and node 712. R2 ensures that drain voltages of M3 and M4 have nearly equal voltages (nodes 708 and 713, respectively). Note that although $V_G$ can have a flat temperature characteristic, that voltage is still not as suitable as the reference voltage VREF at node 722. For example, $V_G$ has a lower PSRR than VREG and has more thermal noise. Also, $V_G$ can vary more than VREF.

The voltage $V_R$ at node 706 is supplied to the negative input of error amplifier (EA2) 705 and has a negative temperature coefficient. PMOS transistor M5 has a source terminal coupled to VDD node 702 and a drain terminal coupled to the intermediate node 720. Transistor M5 has a gate terminal coupled to the output of amplifier EA2 705. Amplifier 705 has one input coupled to the VR node 706 and the other input coupled to the intermediate node 720. Resistor $R_3$ is coupled between node 720 and VSS node 704. PMOS transistor M6 has a source terminal coupled to VDD and a drain terminal coupled to the output node 722. Transistor M6 has a gate terminal of transistor coupled to the output of amplifier 705. The error amplifier EA2 705 along with transistors M5, M6, and resistor $R_3$ combine to develop a drain current $I_6$ from transistor M6 that is proportional to $V_R/R_3$. The drain current $I_6$ from transistor M6 is mirrored from the drain current $I_5$ and has a negative temperature coefficient as indicated in FIG. 7. Thus, the current $I_6$ is based both on the relative sizes of transistors M5 and M6 and the resistance $R_3$. The current $I_6$ can be tuned by adjusting R3 and the relative size of the transistors M5 and M6.

PMOS transistor M7 has a source terminal coupled to VDD node 702 and a drain terminal coupled to the output node 722. Transistor M7 has a gate terminal coupled to node 716, which is the output of amplifier (EA1) 703. M7 supplies a drain current $I_7$ having a positive temperature coefficient. The current $I_7$ is a mirrored current of the drain current from transistor M3 and is based both on the relative sizes of M3 and M7 and the resistance $R_1$. The currents $I_6$ and $I_7$ are combined to develop a voltage reference (VREF) across the resistor $R_4$, where VREF=R4×($I_6$+$I_7$). The currents $I_6$ and $I_7$ are sized so when combined the temperature coefficient of the combined current and therefore the voltage across R4 is low (near zero) resulting in a substantially flat current (VREF/R4) and voltage characteristic across temperature as shown in FIG. 7. Note that the resistors shown in FIG. 7 are assumed to have zero temperature coefficients and although there may be slight variations in resistance across temperature, those variations are not considered significant for purposes herein. Note that the resistors $R_1$, $R_3$, and R4 are shown in the illustrated embodiment as variable resistors and may each be formed of multiple resistor elements programmably configured to be in parallel and/or series to have the desired resistance value. The resistance values may be set during product test or other appropriate time to have the desired resistance values. The resistor $R_2$ may be fixed or may also be implemented as a variable resistor in embodiments to better tune the circuit. The relative sizes of the transistors may be fixed or programmable and adjusted during product test to achieve the desired relative sizes. The various sizes of the transistors and the resistors are set to ensure that the currents $I_6$ and $I_7$, when combined, result in a combined current with a low (substantially zero) temperature coefficient as explained more fully herein.

Figure 8:
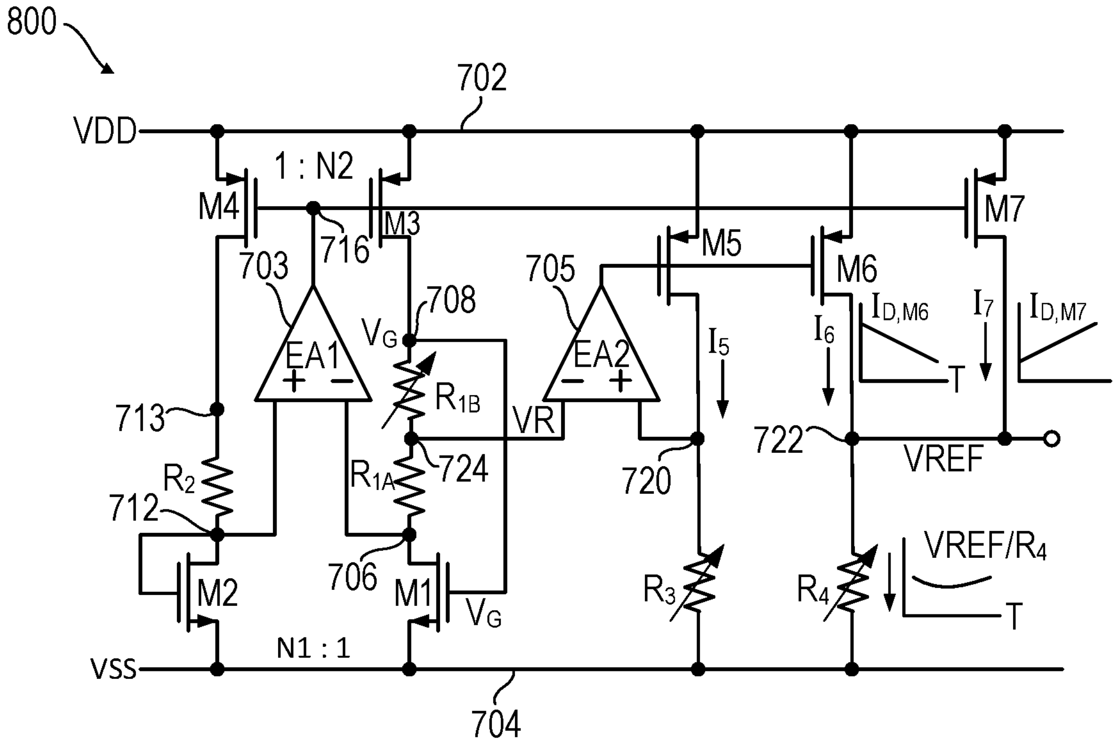
FIG. 8 illustrates another embodiment of a voltage reference circuit that is capable of operating with a low supply voltage and supplies a voltage reference that is stable over temperature.

FIG. 8 illustrates an embodiment of a voltage reference circuit 800 in which the resistor $R_1$ is split into resistors $R_{1A}$ and $R_{1B}$. The values of $R_{1A}$ and $R_{1B}$ are not necessarily equal. Tapping VR from an intermediate point of $R_1$ at node 724 relaxes the performance requirements of EA2 705 by increasing the voltage at node 724.

The temperature coefficients (TCs) for $I_6$ and $I_7$ need to be set appropriately. TC programmability is described in the following. For the voltage reference circuit shown in FIG. 7, where the subscript "1" for transistor parameters indicates M1 parameters and $I_1$ and $R_1$ are shown, $$VR = V_{GS1} - I_1R_1 = V_{DSAT1} + V_{TH} - I_1R_1$$

Since $$g_m = \frac{2I_D}{V_{DSAT1}}$$

and from the constraint $g_{m1}R_1=1$, $V_{DSAT1}=2I_1R_1$

Therefore, $VR=2I_1R_1+V_{TH}-I_1R_1=V_{TH}+I_1R_1$ (4)

The temperature dependent threshold voltage has the form $$V_{TH}(T) = V_{TH,T0} - \alpha_1(T - T_0)$$

where $T_0$ is the nominal temperature and T is the operating temperature, respectively and $\alpha_1$ is the threshold voltage temperature coefficient (tempco). Note also that the drain current of M1 has a proportional to absolute temperature (PTAT) behavior. Drain current increases almost linearly as temperature increases, i.e., $$I_1(T) = I_{1,T0}(1 + \alpha_2(T - T_0)) \quad (5)$$

where $\alpha_2$ is the tempco of $I_1$. Inserting the temperature dependent threshold voltage and drain current of M1 results in $$VR(T) = V_{TH,T0} + R_1 I_{1,T0} + [R_1 I_{1,T0}\alpha_2 - \alpha_1](T - T_0) \quad (6)$$

By adjusting the value of $R_1 I_{1,T0}$ by either changing the value of $R_1$ or changing the value of W/L of device M1, or more generally by a combination of both, the temperature coefficient of the VR can be set. In the embodiment of FIGS. 7 and 8, the temperature coefficient of VR is set to be negative, allowing the temperature coefficient of $V_G$ at node 708 to be near zero to thereby allow lower voltage operation.

Substituting for $1_1$ from equation 3 above can eliminate $I_1$ from Eq. 1

$$VR = V_{TH} + \frac{1}{2\beta_1 R_1},$$

$$\text{where where } \beta_1 = \mu_n C_{ox} \frac{W_1}{L_1}$$

where $C_{ox}$ is the oxide capacitance of the transistor and $\mu_n$ is the mobility parameter of an NMOS device. The temperature coefficient can be adjusted by adjusting W/L, R, or both. The device ratio of M1 (W/L) and R1 is chosen such that Eq. (6) has a negative temperature coefficient.

To get a flat temp coefficient for VREF in FIG. 7, VR is converted into current $I_5$ (VR/R3), which is mirrored by M6, and summed with a current proportional to the current through M1 (equation 5 above), which has a positive temperature coefficient. The resulted combined current is converted to a voltage by the resistor R4.

The current $I_6$ as function of temperature, $I_6$(T) to be summed with $I_7$ is calculated as, $$I_6(T) = VR(T)/R_3 = (V_{TH,T0} + R_1 I_{1,T0} + [R_1 I_{1,T0}\alpha_2 - \alpha_1](T - T_0))/R_3$$

VREF(T)=$R_4$IREF=$R_4$($I_6$(T)+K$I_1$(T)), where K is the current gain of $I_1$ due to the relative sizes of transistors M3 and M7 and K$I_1$=$I_7$. Thus, $$VREF(T) = \frac{R_4}{R_3}\{V_{TH,T0} + (R_1 + KR_3)I_{1,T0} + [(R_1 + KR_3)I_{1,T0}\alpha_2 - \alpha_1](T - T_0)\}$$

To achieve a near flat temperature characteristic for VREF (T), the term $[(R_1+KR_3)I_{1,T0}\alpha_2-\alpha_1]$ should be set to zero. Typically, that is achieved by changing the W/L ratio of M7 and M3 since K=(W7/L7)/(W3/M3).

Figure 9:
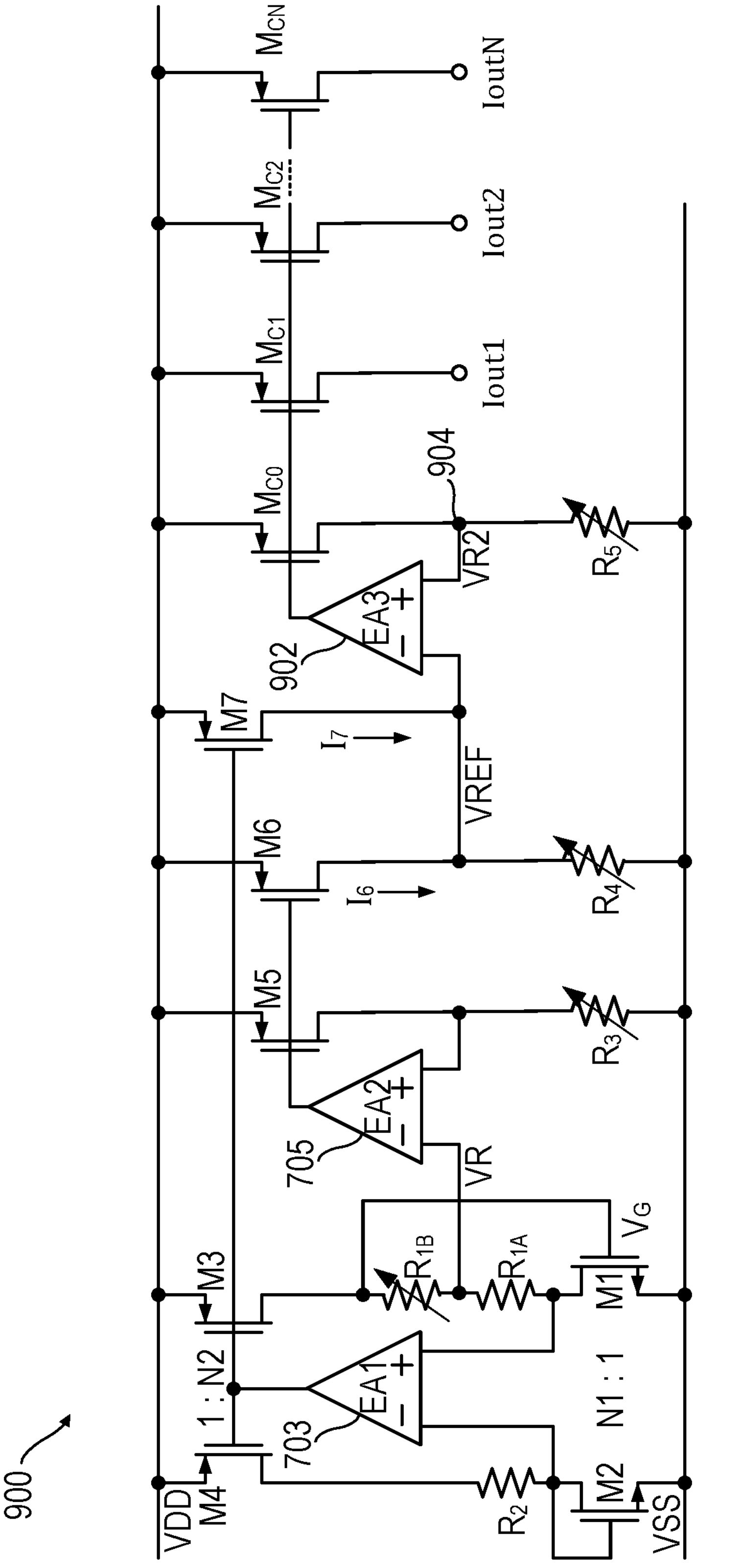
FIG. 9 illustrates an embodiment of a voltage and current reference circuit that is capable of operating with a low supply voltage and also supplies a voltage reference and reference currents that are stable over temperature.

Referring to FIG. 9, in addition to providing a voltage reference, an embodiment of a voltage and current reference circuit 900 provides both a voltage reference VREF and current references Iout1 through IoutN. The reference circuit 900 includes the same components as FIG. 7 (if $R_{1A}$=0) and FIG. 8. In addition, the error amplifier (EA3) 902 receives the $V_{REF}$ voltage as one of its inputs and the voltage VR2 from node 904 at its other input. The output of EA3 902 is supplied to the gates of transistors $M_{C0}$, $M_{C1}$, $M_{C2}$, and $M_{CN}$. The drain current $I_{C0}$ from $M_{C0}$ can be adjusted by adjusting $R_5$. That current is mirrored in transistors $M_{C1}$, $M_{C2}$, and $M_{CN}$ to generate Iout1 through IoutN. The magnitudes of the reference currents are determined by the W/L ratios of $M_{C0}$, $M_{C1}$, $M_{C2}$, and $M_{CN}$.

Figure 10:
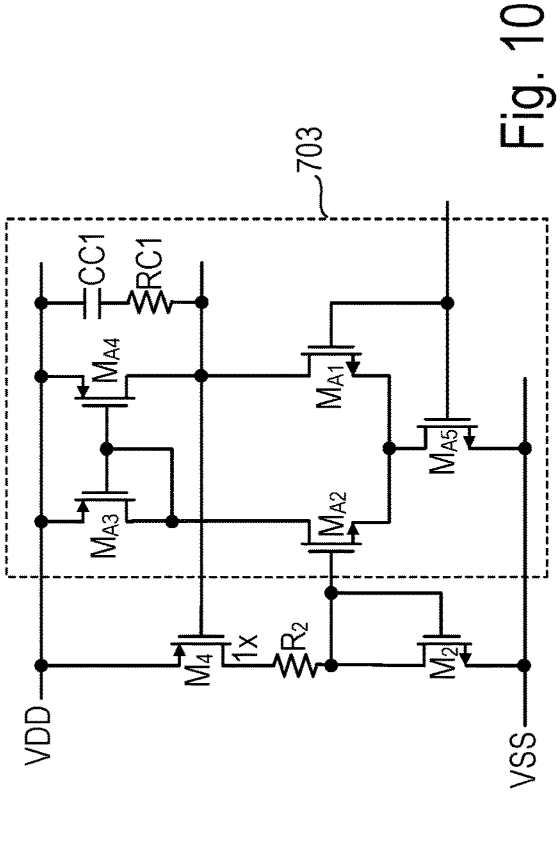
FIG. 10 illustrates an embodiment of an error amplifier.

FIG. 10 illustrates an embodiment of error amplifier EA1 703 that may be used for all the amplifiers shown herein. Of course, other amplifier topologies may be used for some or all of the amplifiers. The amplifier embodiment includes NMOS transistors $M_{A1}$, $M_{A2}$, and $M_{A5}$, PMOS transistors $M_{A3}$ and $M_{A4}$, capacitor CC1, and resistor RC1. Capacitor CC1 and resistor RC1 form a compensation network for the loop that includes EA1. Other compensation networks can also be used.

Figure 11:
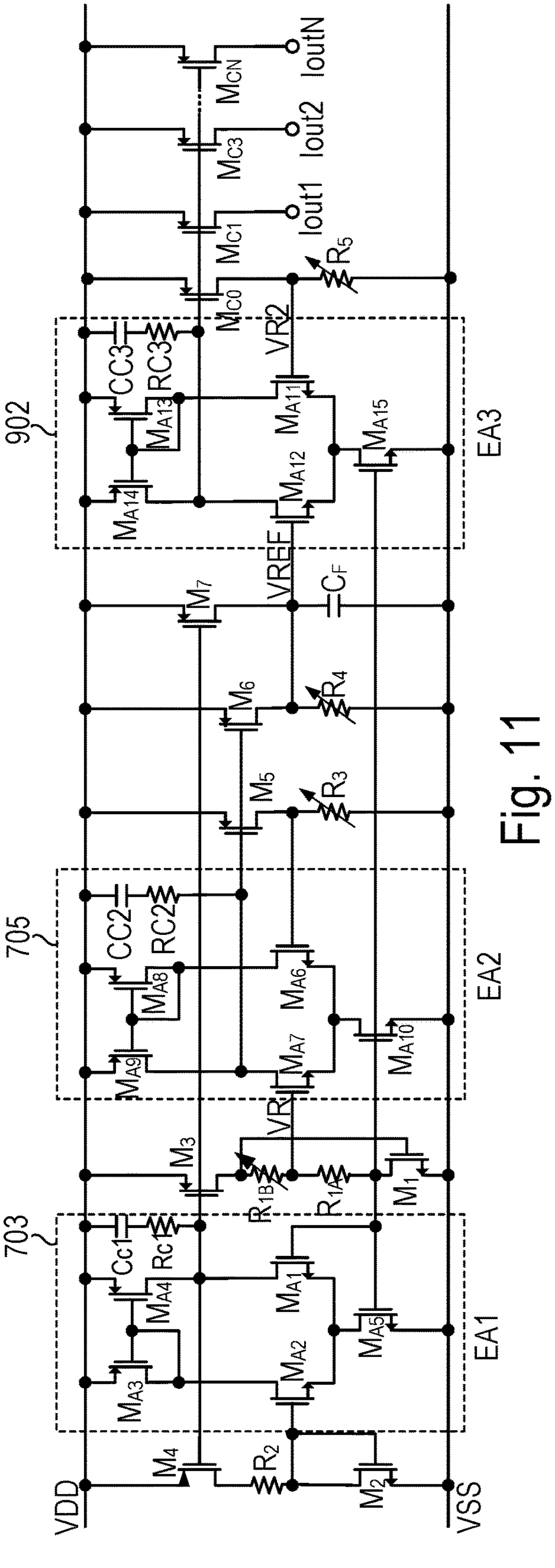
FIG. 11 illustrates an embodiment of a voltage and current reference circuit with the error amplifiers shown in detail.

FIG. 11 illustrates the voltage reference and current reference circuit 900 with the error amplifier EA1 703, EA2 705, and EA3 902 shown in detail. EA2 includes NMOS transistors $M_{A6}$, $M_{A7}$, $M_{A10}$ and PMOS transistors $M_{A8}$ and $M_{A9}$. Capacitor CC2 and resistor RC2 form the compensation network for EA2. EA3 includes NMOS transistors $M_{A11}$, $M_{A12}$, $M_{A15}$ and PMOS transistors $M_{A13}$ and $M_{A14}$. Capacitor CC3 and resistor RC3 form the compensation network for EA3.

Figure 12:
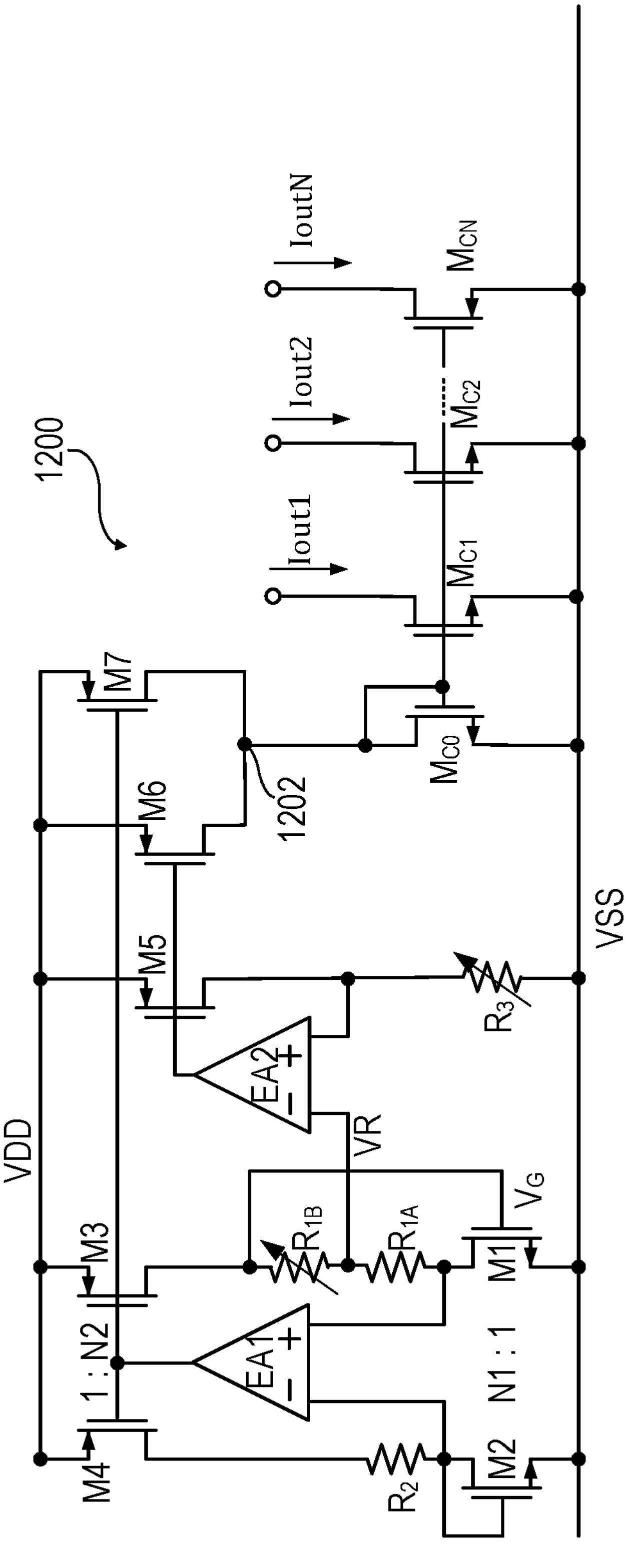
FIG. 12 illustrates an embodiment of a current reference circuit.

FIG. 12 illustrates an embodiment 1200 of a current reference circuit. The current reference circuit 1200 provides a voltage reference $V_{REF}$ at node 1202 and reference currents Iout1 through IoutN. Compared to reference circuit 700 FIG. 7, in the embodiment of FIG. 12 the currents from M6 and M7 are supplied directly to the diode connected NMOS $M_{C0}$ (instead of R4 of reference 700). Current mirrors are formed by diode connected transistor $M_{C0}$ and output transistors, $M_{C1}$, $M_{C2}$, and $M_{CN}$. Transistors $M_{C1}$, $M_{C2}$, and $M_{CN}$ are coupled between 1202 as a supply voltage and VSS to sink the reference currents. The current mirroring ratios are set by output device aspect ratios (W/L) normalized to the diode connected device ($M_{C0}$) aspect ratio.

Figure 13:
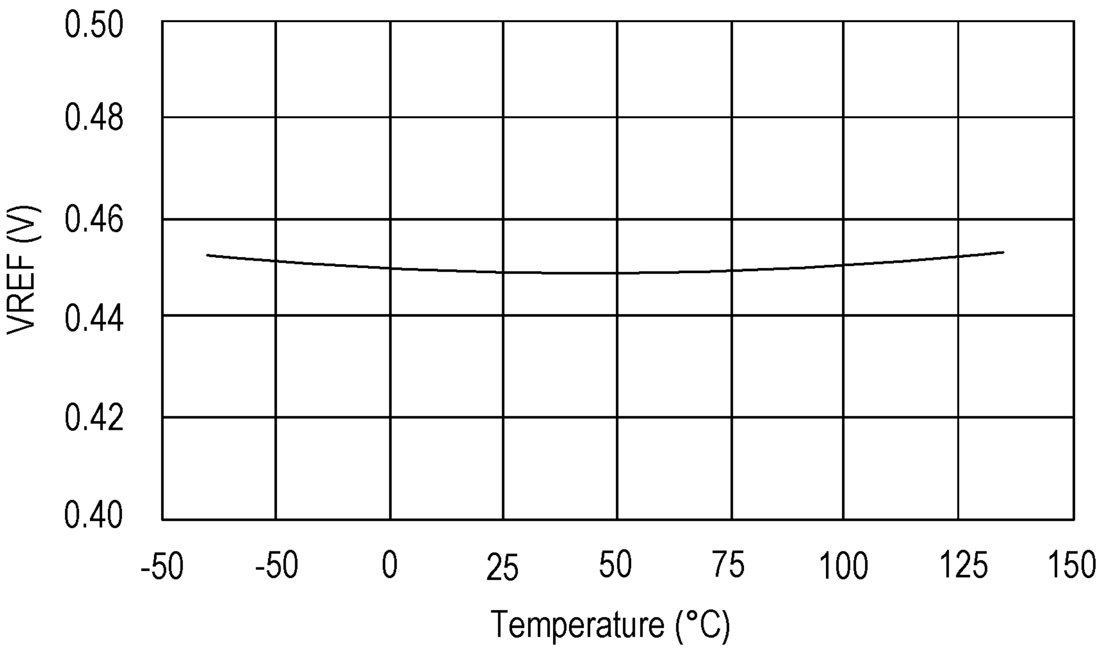
FIG. 13 illustrates an example graph of the voltage reference versus temperature.
Figure 14:
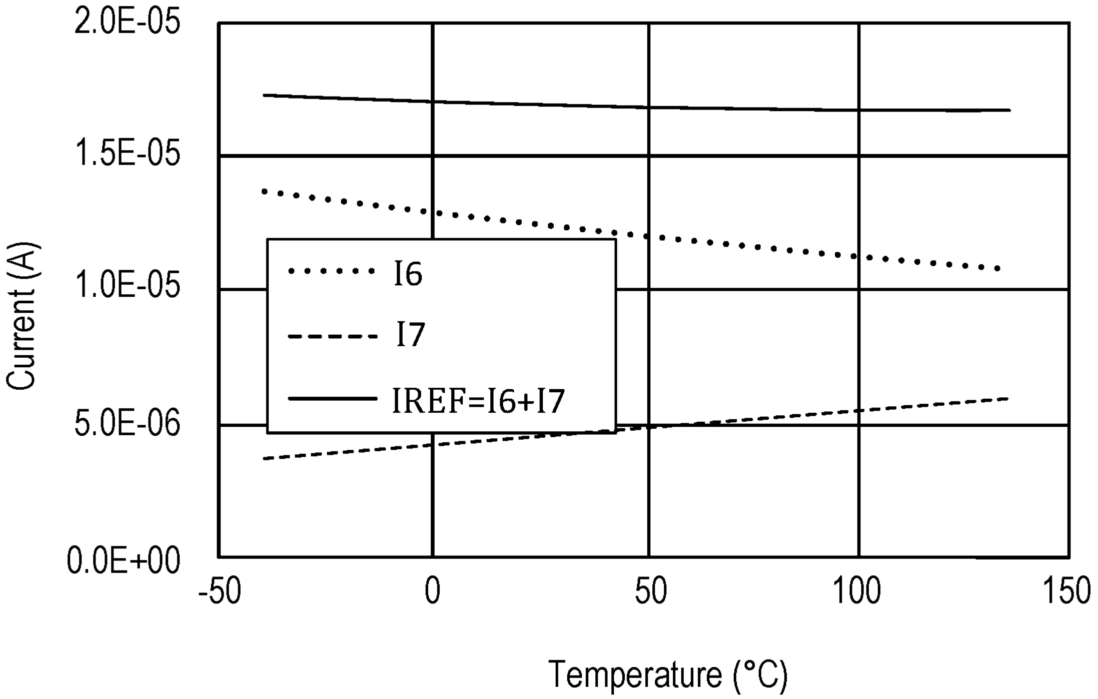
FIG. 14 illustrates how two currents are combined to generate the current IREF that is substantially constant over temperature.

FIG. 13 illustrates an example graph of the voltage reference VREF over temperature generated, e.g., by the embodiment illustrated in FIG. 7. The temperatures shown in FIG. 13 are one example of a temperature range of interest for a particular embodiment but the temperature range of interest can vary according to the particular application in which the voltage reference is used. As can be seen, the voltage reference VREF is substantially constant reflecting the near zero temperature coefficient at approximately 0.45 V, with slightly higher voltages at the highest and lowest portions of the temperature range. FIG. 14 illustrates how the two currents $I_6$ and $I_7$ from FIG. 7 are combined to generate the current IREF that is substantially constant over temperature (near zero temperature coefficient).

Figure 15:
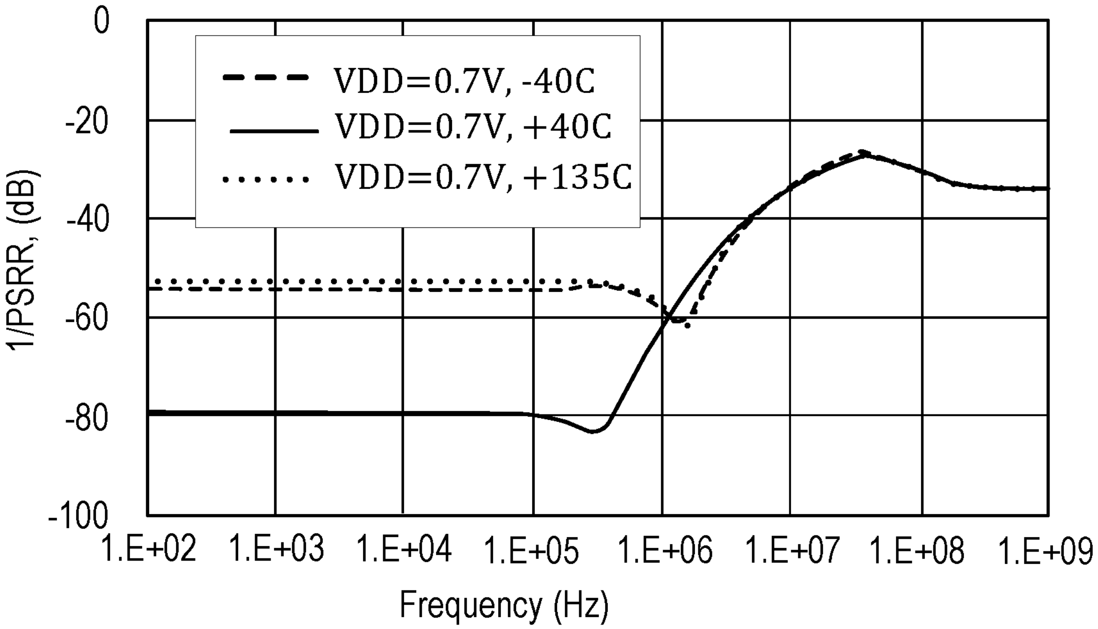
FIG. 15 illustrates an example graph of PSRR over frequency for VDD=0.7V at different temperatures.
Figure 16:
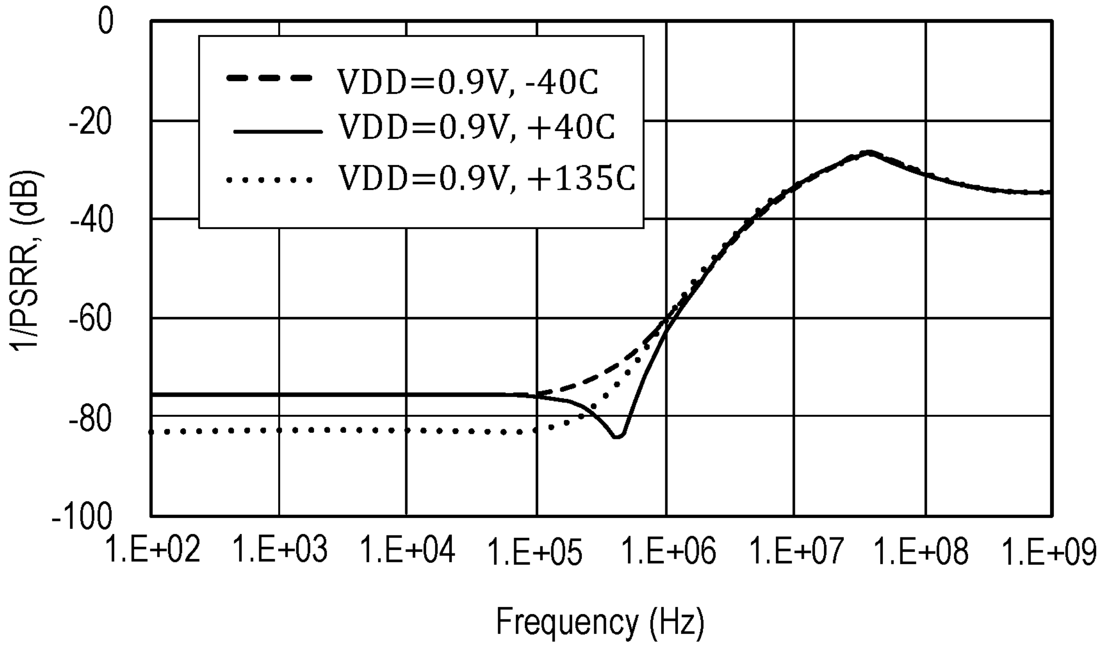
FIG. 16 illustrates an example graph of PSRR over frequency for VDD=0.9V at different temperatures.

FIG. 15 illustrates an example graph of 1/PSRR over frequency for VDD=0.7V at different temperatures. Note that the PSRR is reduced by the increase in frequency. FIG.

16 illustrates an example graph of 1/PSRR over frequency for VDD=0.9V at different temperatures. Note that the PSRR is negatively affected by the increase in frequency. In general it is expected that PSRR will be higher for higher supply voltages.

Thus, embodiments described herein can be employed in products where a temperature independent, low-noise, high-PSRR voltage reference capable of low voltage operation (e.g., VDD down to 0.7V) is needed. Various embodiments described above provide a voltage reference circuit that operate with VDD down to, e.g., 0.7V. If the same embodiments are implemented with input/output (I/O) devices having thicker oxides that support higher voltage devices, the voltage reference circuit can work over a wide range of from 3.6V down to 1.1V enabling simplified global regulator design. Thus, embodiments of the voltage reference circuit can operate in a large supply voltage range (e.g., 0.7V to 1.0V) when implemented with core devices and a supply range of 1.1V to 3.6V operation when implemented with I/O devices. The net result is design flexibility. The various embodiments also provide high PSRRs, dissipate low-power for a given output noise while maintaining superior temperature independence, i.e., low temperature-coefficient (TC) across a wide-temperature range. The reference circuit does not require any calibration for high-PSRR. The reference circuit's inherent high PSRR characteristics allows the reference circuit to be used without additional supply filtering in noisy or high-ripple supply environments. In addition, the embodiments described herein provide more robust protection against device mismatch effects compared to other designs.

Thus, a low voltage temperature compensated, high PSRR voltage and current reference has been described. The description of the invention set forth herein is illustrative and is not intended to limit the scope of the invention as set forth in the following claims. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. A voltage reference circuit comprising:

a first amplifier;

a second amplifier;

a first transistor of a first conductivity type having first and second current terminals coupled between a first supply voltage node and an output node, and having a control terminal coupled to an output of the first amplifier;

a second transistor of the first conductivity type having first and second current terminals coupled between the first supply voltage node and the output node, and having a gate terminal coupled to an output of the second amplifier;

a first resistor coupled between the output node and a second supply voltage node;

a first transistor of a second conductivity type having first and second current terminals coupled between the second supply voltage node and a first intermediate node, and having a control terminal coupled to a second intermediate node;

a second transistor of the second conductivity type having first and second current terminals coupled between the second supply voltage node and a third intermediate node and having a control terminal coupled to the third intermediate node;

at least a second resistor coupled between the first intermediate node and the second intermediate node;

wherein the first amplifier has a first input coupled to the first intermediate node and has a second input coupled to the third intermediate node;

wherein a first current supplied by the first transistor to the first resistor has a positive temperature coefficient;

wherein a second current supplied by the second transistor to the first resistor has a negative temperature coefficient; and wherein the first current and the second current combine to generate an output voltage across the first resistor.

2. The voltage reference circuit as recited in claim 1 wherein the output voltage has a near zero temperature coefficient that is based on the combination of the positive temperature coefficient of the first current and the negative temperature coefficient of the second current.

3. The voltage reference circuit as recited in claim 1 further comprising:

a third transistor of the first conductivity type having first and second current terminals coupled between the first supply voltage node and the second intermediate node, and having a control terminal coupled to the output of the first amplifier;

a fourth transistor of the first conductivity type having first and second current terminals coupled between the first supply voltage node and a fourth intermediate node, and having a control terminal coupled to the output of the first amplifier; and a third resistor coupled between the third intermediate node and the fourth intermediate node.

4. The voltage reference circuit as recited in claim 3 further comprising:

a fifth transistor of the first conductivity type having first and second current terminals coupled between the first supply voltage node and a fifth intermediate node, and having a gate terminal coupled to an output of the second amplifier; and a fourth resistor coupled between the second supply voltage node and the fifth intermediate node.

5. The voltage reference circuit as recited in claim 4 wherein the second current changes responsive to a change in a resistance value of the third resistor.

6. The voltage reference circuit as recited in claim 4 wherein the first current changes responsive to a change in a resistance value of the second resistor.

7. The voltage reference circuit as recited in claim 3 wherein the first conductivity type is PMOS and the second conductivity type is NMOS and wherein the first voltage supply node is VDD and the second voltage supply node is VSS.

8. The voltage reference circuit as recited in claim 3 wherein a temperature coefficient of voltage at the second intermediate node provides a substantially flat or downward sloping temperature characteristic across a temperature range of interest.

9. The voltage reference circuit as recited in claim 3 wherein a temperature coefficient of voltage at the first intermediate node is negative.

10. The voltage reference circuit as recited in claim 4 further comprising:

a fifth resistor coupled between the first intermediate node and a drain terminal of the third transistor.

11. The voltage reference circuit as recited in claim 4 wherein the first intermediate node is coupled to a first input of the second amplifier and the fifth intermediate node is coupled to a second input of the second amplifier.

12. The voltage reference circuit as recited in claim 1 further comprising:

a voltage to current converter coupled to the output voltage to supply one or more current references generated using the output voltage.

13. The voltage reference circuit as recited in claim 12 wherein the voltage to current converter circuit comprises:

a third amplifier having a first input coupled to the output node and having a second input coupled to a voltage to current converter node;

a first voltage to current converter transistor of the first conductivity type having current terminals coupled between the first voltage supply node and the voltage to current converter node and having a gate node coupled to an output of the third amplifier; and a first voltage to current converter resistor coupled between the voltage to current converter node and the second voltage supply node.

14. The voltage reference circuit as recited in claim 13 wherein the voltage to current converter circuit further comprises:

one or more additional voltage to current converter transistors of the first conductivity type having current terminals coupled between the first voltage supply node and respective current output nodes and having respective gate nodes coupled to the output of the third amplifier.

15. A method for providing a voltage reference from a voltage reference circuit comprising:

supplying respective control terminals of a first transistor and a second transistor with a first voltage present on an output of a first amplifier;

supplying a first current from the first transistor to a first resistor;

supplying a second current from the second transistor that is proportional to a voltage on a first input terminal of the first amplifier divided by a resistance value of the first resistor, the second current having a negative temperature coefficient;

supplying a control terminal of a third transistor with a second voltage present on an output of a second amplifier and supplying a third current having a positive temperature coefficient from the third transistor;

supplying the second current and the third current to a second resistor to generate the voltage reference with a near zero temperature coefficient; and supplying a control terminal of a fourth transistor with a voltage present on a first input of the second amplifier.

16. The method as recited in claim 15 further comprising:

supplying respective control terminals of a fifth transistor and a sixth transistor with the second voltage present on the output of the second amplifier;

and supplying a control terminal of a seventh transistor with a voltage present on a drain terminal of the sixth transistor.

17. The method as recited in claim 16 further comprising:

configuring the voltage reference circuit so the voltage present on the drain terminal of the fourth transistor has a substantially flat or negative temperature coefficient over temperature.

18. A reference circuit comprising:

a first transistor having first and second current terminals coupled between a first supply voltage node and an output node supplying a voltage reference, the first transistor having a control terminal coupled to an output of a first amplifier;

a second transistor having first and second current terminals coupled between the first supply voltage node and the output node, and having a control terminal coupled to an output of a second amplifier;

a first resistor coupled between the output node and a second supply voltage node;

a third transistor having first and second current terminals coupled between the second supply voltage node and a first intermediate node, and having a control terminal coupled to a second intermediate node;

a fourth transistor having first and second current terminals coupled between the second supply voltage node and a third intermediate node and having a control terminal coupled to the third intermediate node;

a second resistor coupled between the first intermediate node and the second intermediate node;

wherein the first amplifier has a first input coupled to the first intermediate node and has a second input coupled to the third intermediate node;

wherein a first current supplied by the first transistor to the first resistor has a positive temperature coefficient;

wherein a second current supplied by the second transistor to the first resistor has a negative temperature coefficient; and wherein the first current and the second current combine to generate the voltage reference across the first resistor, the voltage reference having a near zero temperature coefficient.

19. The reference circuit as recited in claim 18 further comprising:

a fifth transistor having first and second current terminals coupled between the first supply voltage node and the second intermediate node, and having a control terminal coupled to the output of the first amplifier;

a sixth transistor having first and second current terminals coupled between the first supply voltage node and a fourth intermediate node, and having a control terminal coupled to the output of the first amplifier; and a third resistor coupled between the third intermediate node and the fourth intermediate node.

20. The reference circuit as recited in claim 19 wherein the temperature coefficient of voltage at the second intermediate node provides a substantially flat or downward sloping temperature characteristic across a temperature range of interest.

* * * * *